Patented Feb. 1, 1938

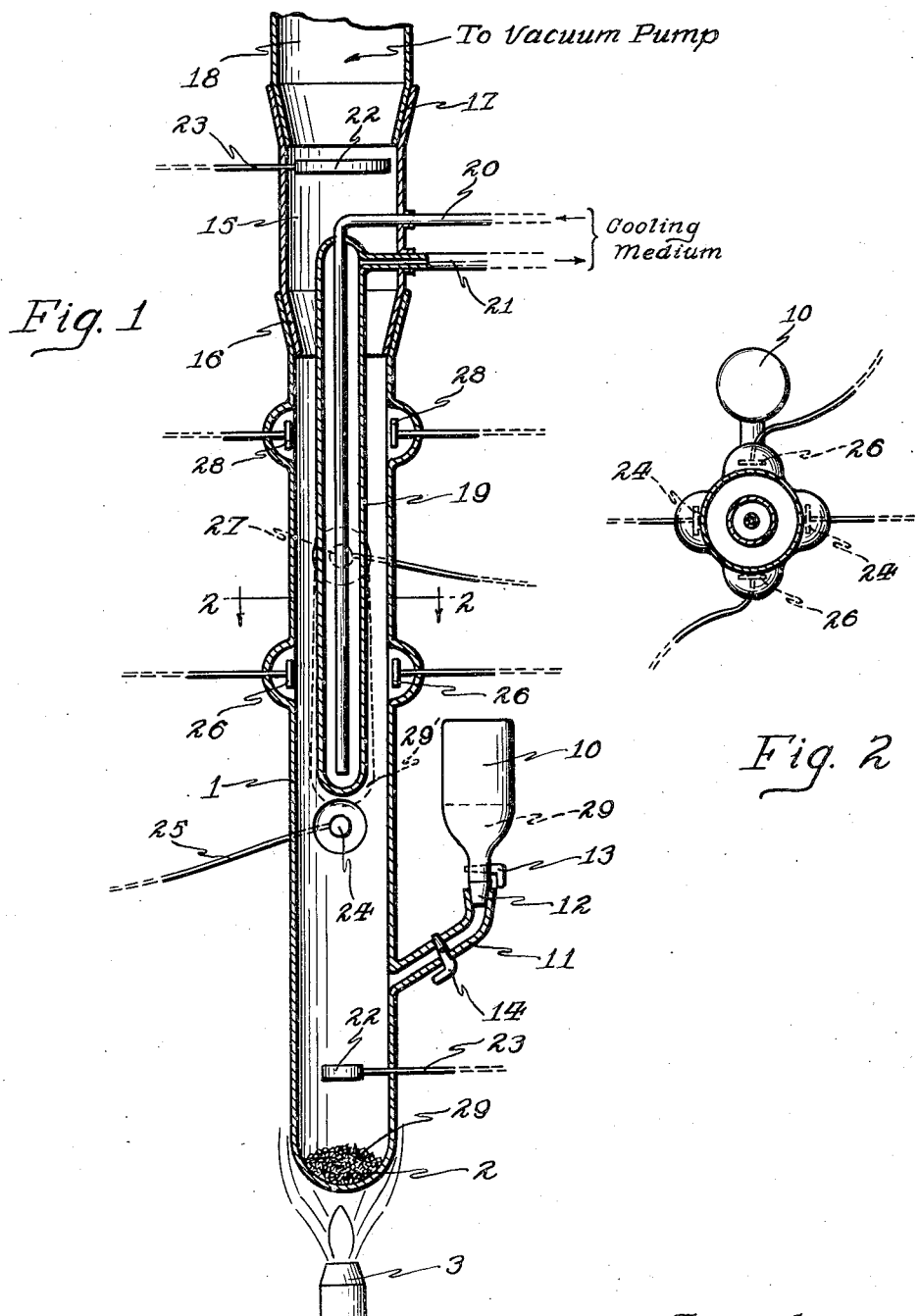

2,106,780

UNITED STATES PATENT OFFICE 2,106,780

METHOD FOR PRODUCING A VITAMIN D PRODUCT

Charles C. Whittier, Chicago, Ill.

Application May 2, 1934, Serial No. 723,496
Renewed February 9, 1937

11 Claims. (Cl. 204—31)

This invention relates to the manufacture of vitamin D products and particularly to improvements in the method described in my co-pending application Serial No. 711,539 filed February 16, 1934.

The main objects of the present invention are to provide an improved method of manufacturing vitamin D products and obtaining an increased concentration of vitamin D characteristics per unit of substance treated.

The herein described invention is predicated upon the electro-chemical transformation of crystalline ergosterol, by subjecting the same while in a vapor state to the bombarding action of electrons passing between anode and cathode terminals in an electrically energized vacuum tube, into a new solid structure having the anti-rachitic properties known as vitamin D, as described in said co-pending application; but the present invention embodies the further steps of repetitive treatment by passing the vapor through successive zones of electronic activity and an additional electronic treatment of the substance after being solidified.

In the drawing, I have illustrated a specific form of apparatus somewhat diagrammatically, in that the drawing shows only the structure of the vacuum tube and omits the supporting frame which in practice is employed to support and facilitate the assembly and removal of certain parts of the apparatus in carrying out the process.

Figure 1 is a vertical or longitudinal section showing the tube and its related appliances.

Fig. 2 is a transverse section taken on the line 2—2 of Fig. 1.

In the study and manufacture of vitamin D products, it has been found that ergosterol or an ergosterol-like substance is present in all plant and animal substances that are capable of being antirachitically activated or endowed with the qualities known as vitamin D and ergosterol has accordingly come to be regarded as the parent substance from which vitamin D is produced. The term "ergosterol" as employed in the claims is therefore intended to include any substance from which vitamin D can be produced.

In the form shown, the apparatus consists of a vacuum tube 1 having its lower end closed and forming a flask 2 provided with heating means indicated as a burner 3.

On one side of the tube, there is a flask 10 supported in inverted position by a branch pipe 11 and having a ground joint connection 12 therewith. The flask 10 and pipe 11 may be provided with valves 13 and 14 respectively or other appropriate feed control means.

At the upper end of the tube 1 there is an intermediate fitting or tube section 15 which has a tapered ground joint connection 16 with the tube 1 and a similar tapered ground joint connection 17 with the pipe 18 which is connected to a vacuum pump for exhausting the air from the tube 1.

An elongated condenser 19 is mounted on the fitting 15 and extends below the said fitting for a considerable distance into the tube 1. The condenser is preferably concentrically located within the tube and is provided with inlet and outlet branch pipes 20 and 21 whereby water or other cooling medium is circulated through the condenser.

The tube 1 is provided with a plurality of pairs of electrodes, anode and cathode, for electrically energizing the space within the tube. There are two electrodes 22 located respectively above and below the condenser and connected to a suitable source of high-tension electric current connected with the conductors 23, arranged for producing electrical discharges between the electrodes 22. The current which I prefer to employ is alternating current of about 100,000 volts, 5 milli-ampers and a frequency of 1,300 kilocycles.

Spaced above the lower electrode 22 is a pair of electrodes 24 connected with line connection 25 for producing a discharge crosswise of the space within the tube and there are other pairs of electrodes 26, 27 and 28 provided with line connections to a suitable source or sources of electric current. The tubes and flasks are made of glass in my present practice, so that the process may be watched.

In carrying out the present invention, a quantity of sterol, preferably ergosterol 29, or other substance that is to be treated, is placed in the receptacle 10.

The vacuum pump is then set in operation to exhaust the air content of the tube and create a high vacuum therein and water is caused to flow through the condenser. The electric current is then turned on so as to charge the zones of activity that are within the influence of the respective pairs of electrodes 22, 24, 26, 27 and 28. The valves 13 and 14 are manipulated so as to discharge a quantity or controlled flow of the ergosterol 29 to the bottom of the flask 2 where this ergosterol becomes heated and vaporized, the vapor passing upward and in its passage being subjected to the electronic influence which converts it into, or gives it the properties known as, vitamin D during its passage through the zones of influence of the electrodes 22 and 24 which are arranged to produce two sets of discharges arranged at right angles to each other.

The ergosterol vapor condenses upon the condenser in the form of a heavy deposit in the lower end, gradually thinning out to nothing at the top of the deposit which grows along the tube according to the length of time that the operation is continued. The condensate upon the surface of the condenser is subjected, in its liquid and solid states, to further treatment by the discharge between the electrodes 26, 27 and 28.

It will be seen that in the present improved process, the vaporized ergosterol is not only subjected to the discharges passing longitudinally of the tube between the electrodes 22 but is given a second treatment in vapor state by the cross-current of discharges between the electrodes 24 and is finally treated in solid state by both the discharges flowing between the electrodes 22 and those between the pairs of electrodes 26, 27 and 28.

After the condenser becomes coated with solid particles throughout the greater part of its length, say after about nine minutes of continuous operation, the operation is stopped, the flame 3 extinguished, the electric current cut off from the electrodes and the vacuum pump stopped. Then as soon as the parts become sufficiently cool for convenient handling, the tube 1 and fitting 15 are separated from each other and the accumulation of crystals is scraped from the surface of the condenser or is washed therefrom by dissolving the solid particles in ether. It is, however, more economical to scrape the solids from the condenser.

So far as I am aware the exact nature of vitamin D is unknown and is definable only in the terms of its antirachitic activity which is, however, measurable by well-known assaying means. Likewise the exact nature of the electrical discharges that occur in apparatus such as is herein described is also unknown; but according to most recent, generally accepted theories is believed to be a movement of electrons and the change that occurs in the ergosterol when vitamin D is formed is believed to be something in the nature of a rearrangement of the electrons in the atoms of the ergosterol molecule. With this thought in mind, the expression "antirachitically activating electrical discharges" as employed in the claims is intended to include any electrical discharges that will produce this antirachitic activation of ergosterol and particularly such discharges as are explainable by said movement of electrons and said electronic rearrangement of atomic structure in ergosterol and the related substances herein referred to.

Although but one specific embodiment of this invention has been herein shown and described, it will be understood that details of the method and construction illustrated may be modified or omitted without departing from the spirit of my invention as defined by the following claims.

I claim:

1. The method of producing a vitamin D product, which consists in vaporizing ergosterol and subjecting the vapor to the influence of antirachitically activating electrical discharges in successive zones in which the discharges pass in respectively different directions.

2. The method of producing a vitamin D product, which consists in vaporizing ergosterol and subjecting the vapor to the influence of an antirachitically activating electrical discharge in a vacuum, condensing the vapor, and then subjecting the condensate to further treatment by such electrical discharge while the condensate is in solid state.

3. The method of producing vitamin D which consists in vaporizing ergosterol, passing the same through a zone of electrical discharge in a vacuum tube, condensing the treated ergosterol vapor and subjecting the condensate to a transversely directed electrical discharge in the vacuum tube.

4. The method of producing vitamin D which consists in vaporizing ergosterol, passing the same through a zone of electrical discharge between terminals in a vacuum tube, condensing the treated ergosterol vapor and subjecting the condensate to a transversely directed electrical discharge between terminals in the vacuum tube.

5. The method of producing a vitamin D product, which consists in vaporizing and condensing ergosterol in successive zones in a vacuum tube and subjecting both the vapor and its condensate to the influence of an antirachitically activating electrical discharge while subject to a vacuum in said tube.

6. The method of producing a vitamin D product, which consists in vaporizing and condensing ergosterol in successive zones in a vacuum tube and subjecting both the vapor and its condensate to the influence of a plurality of antirachitically activating electrical discharges passing in respectively different directions, while subject to a vacuum in said tube.

7. The method of producing a vitamin D product, which consists in vaporizing ergosterol in a vacuum tube, subjecting the vapor to a plurality of differently directed antirachitically activating electrical discharges under the influence of a vacuum, condensing the vapor, and then subjecting the condensate to further treatment by an additional antirachitically activating electrical discharge.

8. The method of producing a vitamin D product, which consists in vaporizing ergosterol and subjecting the vapor to the influence of antirachitically activating electrical discharge, condensing the vapor, and subjecting the condensates to further treatment by a plurality of relatively differently directed antirachitically activating electric discharges.

9. The method of producing a vitamin D product, which consists in vaporizing ergosterol and subjecting the vapor to the influence of different antirachitically activating electrical discharges in successive zones in a vacuum, condensing the vapor in a succeeding zone, and subjecting the condensate to further treatment by transversely directed electrical discharge in a vacuum.

10. The method of producing vitamin D which consists in vaporizing ergosterol and condensing it in different zones in a vacuum tube, subjecting both the vapor and the condensate to a longitudinally directed electrical discharge, and subjecting the vapor and condensate separately to transversely directed electrical discharges, while the tube is subject to the influence of a vacuum pump.

11. The method of producing vitamin D which consists in vaporizing ergosterol, passing the same through a zone of electrical discharge between terminals in a vacuum tube, condensing the treated ergosterol vapor within the space traversed by said discharge and subjecting the condensate to a transversely directed electrical discharge between other terminals in the vacuum tube.

CHARLES C. WHITTIER.